United States Patent [19]

Pornin et al.

[11] 4,025,703

[45] May 24, 1977

[54] HYDROPHILIC MODIFIED ACRYLIC POLYMERS PARTICULARLY HYDRODISPERSIBLE OR HYDROSOLUBLE MODIFIED ACRYLIC POLYMERS AND METHOD OF PREPARING THE SAME

[75] Inventors: René Pornin, Arthez-de-Bearn; Jean-Henri Blanc, Pau; Robert Voirin, Mourenx, all of France

[73] Assignee: Societe Nationale Elf Aquitaine (Production), Paris, France

[22] Filed: July 23, 1975

[21] Appl. No.: 598,184

[30] Foreign Application Priority Data

July 26, 1974 France ................... 74.26009

[52] U.S. Cl. .......................... 526/16; 526/49; 526/263; 526/264; 526/304; 526/307; 526/327

[51] Int. Cl.² .......... C08F 8/32; C08F 220/04; C08F 220/06

[58] Field of Search ............ 450/608.5, 619.5, 742; 260/80 M, 80.3 N, 80.3 R, 80.72, 80.73, 89.55, 86.1 R, 86.1 N; 526/16, 49, 304, 307, 203, 264

[56] References Cited

UNITED STATES PATENTS

| | | | |
|---|---|---|---|
| 1,976,679 | 10/1934 | Fikentsher et al. | 8/6 |
| 2,109,877 | 3/1938 | Barrett | 260/2 |
| 3,007,887 | 11/1961 | Essig | 260/29.6 |
| 3,117,108 | 1/1964 | Calvete | 260/80.5 |

Primary Examiner—Stanford M. Levin
Attorney, Agent, or Firm—Ostrolenk, Faber, Gerb & Soffen

[57] ABSTRACT

Novel hydrophilic modified acrylic polymers, particularly hydrodispersible or hydrosoluble modified acrylic polymers, containing, expressed in molar percentages, $p\%$ units derived from an acrylic acid or ester, $q\%$ units derived from an alkanolamide of said acid, $r\%$ units derived from the alkanolammonium salt of said acid, and $s\%$ units derived from a vinyl monomer, wherein $p$, $q$, $r$, $s$ represent integers so selected that $1 \leq p \leq 95$, $0 \leq q \leq 99$, $0 \leq r \leq 99$ and $0 \leq s \leq 40$, the sum $(p+q+r+s)$ being equal to 100, and $q$ and $r$ never being nil simultaneously.

21 Claims, No Drawings

HYDROPHILIC MODIFIED ACRYLIC POLYMERS PARTICULARLY HYDRODISPERSIBLE OR HYDROSOLUBLE MODIFIED ACRYLIC POLYMERS AND METHOD OF PREPARING THE SAME

The present invention relates to hydrophilic modified acrylic polymers, particularly hydrodispersible or hydrosoluble modified acrylic polymers, and to a method of preparing said polymers.

Many hydrodispersible or hydrosoluble polymers are already known, such as certain vinyl polymers, the most usual being polyvinyl alcohols and polyacrylamides.

The invention provides novel hydrophilic polymers, particularly hydrodispersible or hydrosoluble polymers which are derived from polyacrylic acids or esters.

The novel modified acrylic polymers of the invention contain, expressed in molar percentages, $p$ % units A of the formula

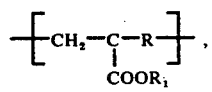

$q$ % units B of the formula:

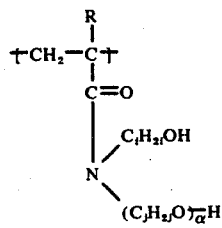

$r$ % units C of the formula:

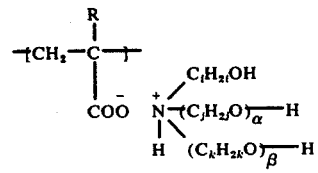

and $s$ % units D of the formula:

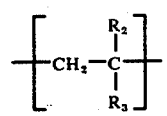

wherein R represents one or more radicals selected from the groups comprising hydrogen and the ethyl and methyl radicals, $R_1$ stands for hydrogen or an alkyl radical containing 1 to 4 carbon atoms, the symbols R and $R_1$ never representing at the same time an hydrogen atom or a methyl radical, $i$, $j$, and $k$ stand for integers which may vary from 1 to 6 and $\alpha$ and $\beta$, which may be identical or different, are equal to 0 or 1, $R_2$ represents an hydrogen atom or a methyl radical and $R_3$ stands for a monovalent radical selected from the group comprising the amido, amino, pyridyl and pyrrolidonyl radicals, $p$, $q$, $r$ and $s$ represent integers so selected that $1 \leq p \leq 95$, $0 \leq q \leq 99$, $0 \leq q \leq 99$, $0 \leq r \leq 99$ and $0 \leq s \leq 40$, the sum $p+q+r+s$ being equal to 100 and $q$ and $r$ never being nil simultaneously, while more particularly $1 \leq p \leq 85$, $0 \leq q \leq 90$, $5 \leq r \leq 95$ and $0 \leq s \leq 30$.

The units A of the modified acrylic polymers are derived from one or more acrylic monomers selected from the group comprising the ethylacrylic or methacrylic acids, the alkyl acrylates and ethylacrylates the alkyl radical of which contains 1 to 4 carbon atoms and the alkyl methacrylates the alkyl radical of which contains 2 to 4 carbon atoms.

The units B of said polymers are obtained from the units A by substituting the carboxylic acid or the ester group with an alkanolamide, particularly an ethanolamide or diethanolamide group, while the units C are derived from the units A substituting the carboxylic acid or ester group by an alkanolammonium carboxylate group, particularly an ethanolammonium, diethanolammonium or tri-ethanolammonium carboxylate group.

As to the units D, which may be present in a minor proportion with respect to the entire amounts of units A, B and C, they are derived from one or more monomers selected from the group comprising acrylamide, methacrylamide, vinylamine, vinylpyridine and vinylpyrrolidone.

The molecular weight of the modified acrylic polymers of the invention may vary within rather wide limits, advantageously between $0.2 \times 10^6$ and $100 \times 10^6$, more particularly between $0.4 \times 10^6$ and $50 \times 10^6$, and preferably between $1 \times 10^6$ and $20 \times 10^6$.

The modified acrylic polymers according to the invention may include the polymers formed exclusively of units A and B and/or C in molar percentages $p$, $q$ and $r$ which are so selected that $1 \leq p \leq 95$, $0 \leq q \leq 99$ and $0 \leq r \leq 99$, the sum $(p+q+r)$ being equal to 100, $q$ and $r$ not being nil simultaneously, said percentages being preferably so selected that $1 \leq p \leq 85$, $0 \leq q \leq 90$ and $5 \leq r \leq 95$. The polymers for which $5 \leq p \leq 80$, $2 \leq q \leq 80$ and $7 \leq r \leq 80$ are particularly suitable.

Some of the modified polymers of this class may be particularly mentioned, to wit those wherein the units A constituted by at least one of the radicals

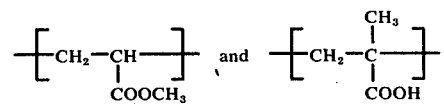

i.e. radicals which are derived respectively from methyl acrylate and/or from methacrylic acid, while the units B are constituted by the following radicals:

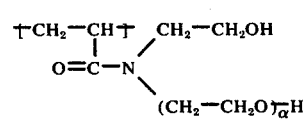

and/or

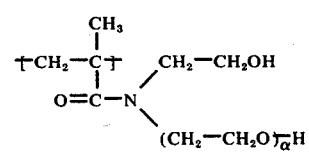

$(i = j = 2$ and $\alpha = 0$ or $1)$,
and the units C are formed of the following groups:

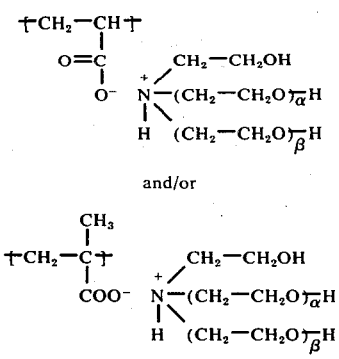

and/or $(i = j = k = 2$, and $\alpha$ and $\beta = 0$ or $1)$.

The method of preparing the modified acrylic polymers according to the invention comprises reacting an acrylic polymer, which has been prepared by polymerizing one or more of the monomers leading to units A, possibly mixed with one or more of the monomers leading to units D, with at least an alkanolamine of formula:

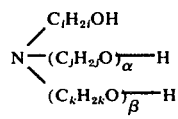

wherein $i$, $j$, $k$ represent numbers which may vary from 1 to 6, and wherein $\alpha$ and $\beta$, which may be identical or different, are equal to 0 or 1, and then separating the modified acrylic polymer from the reaction medium.

The acrylic polymer reacted with the alkanolamine or alkanolamines may be prepared by any method known in the art enabling production of an acrylic polymer of adequate molecular weight, and particularly by emulsion or solution polymerization in the presence of a catalytic system of the Redox type, or by bulk polymerization with active radiations, particularly gamma rays.

The reaction between the acrylic polymer and the alkanolamine or alkanolamines, particularly mono-, di- or triethanolamine, may be carried out in the absence of any solvent or diluent. The reaction may also be performed in a solvent or diluent of the non polar type, particularly in an aromatic, aliphatic or cycloaliphatic hydrocarbon, especially xylene or toluene, or also in a solvent or diluent of the polar type, and more particularly in an aqueous phase.

Depending on whether the solvent is non-polar (hydrocarbon of the xylene type) of polar (aqueous phase), the resulting modified polymer will have a major content of units B having an amide function, or units C having a quaternary ammonium function.

The amount of alkanolamine reacted with the acrylic polymer may vary widely. For example, the molar ratio of the amount of alkanolamine used to the amount of acrylic polymer to be modified may vary between 0.1 and 15, said ratio being more particularly comprised between 0.3 and 5.

The reaction between acrylic polymer and alkanolamine may be carried out at temperatures comprised between 25° and 200° C, the preferred temperatures being comprised between 50° and 150° C. When the reaction is carried out in the presence of a solvent or a diluent, it can be advantageously performed at the boiling temperature of said solvent or diluent, or close to this temperature.

When the reaction between acrylic polymer and alkanolamine is carried out by contacting said alkanolamine with a solution or a dispersion of the acrylic polymer in a solvent or a diluent, the polymer concentration of said solution of dispersion may be advantageously comprised between 1 and 60% by weight, and more particularly between 3 and 40% by weight.

The duration of the reaction between the acrylic polymer and the alkanolamine(s) may vary widely. It may be comprised more particularly between 30 minutes and 120 hours, and advantageously between 1 hour and 80 hours.

The modified acrylic polymer may be separated from the reaction medium by any method known in the art allowing a polymer to be isolate from its solution or its suspension medium. For example, when the modified acrylic polymer is suspended in the reaction medium, it may be separated by mere filtration. When the modified acrylic polymer is dissolved, it may be separated by precipitation in a medium in which the polymer is not soluble, or by evaporation of the volatile components of said solution.

The following examples are given by way of illustration, but not of limitation, of the invention.

EXAMPLES 1 to 5

Monoethanolamine (MEA) was reacted with methyl polyacrylates (MPA) of various molecular weights in dissolved in xylene, said methyl polyacrylates being prepared by polymerization of methyl acrylate dissolved in benzene in the presence of a free radical initiator, which was in the present instance azobisisobutyronitrile.

The reaction of modification of the methyl polyacrylate by ethanolamine was carried out at a temperature of 135° for 16 hours, except in example 4 where the time was only 8 hours.

The reaction mixture was then cooled to room temperature in order to precipitate the modified acrylic polymer, said polymer was separated by filtration, washed alternately with acetone and methanol and dried in a vacuum oven at 50° C.

TABLE I

| Example | Molecular weight of the MPA to be modified (*) | MPA concentration in xylene (% by weight) | Molar ratio MEA/MPA | Modified polymer composition (molar %) (**) units A | units B | units C | Solubility in water |
|---|---|---|---|---|---|---|---|
| 1 | $1.5 \times 10^6$ | 8 | 1.05 | 30 | 60 | 10 | hydro-dispersible |
| 2 | $4 \times 10^6$ | .5 | 1.05 | 35 | 55 | 10 | " |
| 3 | $4.2 \times 10^6$ | 5.5 | 1.05 | 28 | 63 | 9 | " |
| 4 | $0.8 \times 10^6$ | 11.4 | 1.5 | 18 | 74 | 8 | poor |

TABLE I-continued

| Example | Molecular weight of the MPA to be modified (*) | MPA concentration in xylene (% by weight) | Molar ratio MEA/MPA | Modified polymer composition (molar %) (**) units A | units B | units C | Solubility in water |
|---|---|---|---|---|---|---|---|
| 5 | $0.47 \times 10^6$ | 10 | 1.5 | 18 | 72 | 10 | poor |

\* - Molcular weight by weight Mw
\*\* - The formulas of the various units are as follows :

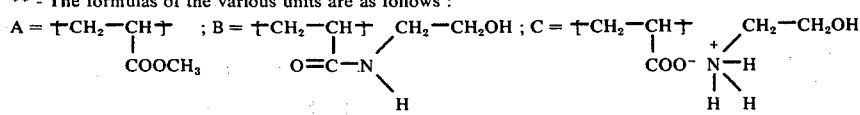

TABLE II

| Example | Molecular weight of the MPA to be Modified (*) | MPA concentration in water (g/100 cm³) | Molar ratio MEA/MPA | Reaction time (hours) | Modified polymer composition (molar %) (**) units A | units B | units C | Solubility in water |
|---|---|---|---|---|---|---|---|---|
| 6 | $0.53 \times 10^6$ | 4 | 1.5 | 72 | 40 | 12 | 48 | good |
| 7 | $0.5 \times 10^6$ | 4 | 1.5 | 112 | 39 | 14 | 47 | good |
| 8 | $0.53 \times 10^6$ | 4 | 2.8 | 48 | 27 | 13 | 60 | poor |
| 9 | $1.1 \times 10^6$ | 4.3 | 2.8 | 48 | 16 | 22 | 62 | good |
| 10 | $4 \times 10^6$ | 2.4 | 2.8 | 52 | 35 | 7 | 58 | poor |
| 11 | $0.53 \times 10^6$ | 4 | 2.8 | 72 | 19 | 16 | 65 | good |
| 12 | $0.53 \times 10^6$ | 4 | 2.8 | 72 | 19 | 20 | 61 | good |
| 13 | $4 \times 10^6$ | 3 | 2.8 | 72 | 36 | 2 | 62 | poor |
| 14 | $4 \times 10^6$ | 3 | 2.8 | 72 | 38 | 12 | 50 | poor |
| 15 | $1.7 \times 10^6$ | 4.2 | 2.8 | 96 | 8 | 21 | 71 | very good |

\*) Molecular weight by weight Mw
\*\*) The formulas of the various units are as follows:

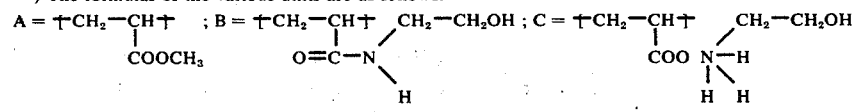

The specific operating conditions and the results obtained are listed in Table I hereinabove.

EXAMPLES 6 and 15

Methyl polyacrylates (MPA) having different molecular weights, prepared either as indicated in example 1 (examples 6 to 8, 11, 12 and 15) or by emulsion polymerization (examples 9, 10, 13 and 14), were reacted with monoethanolamine (MEA), the reaction being carried out at a temperature of 100° C, using water as a diluent.

The reaction mixture was maintained at this temperature for various durations, then was cooled and the modified acrylic polymer was separated by precipitation in a non solvent medium, namely aceton, followed by filtration. The filtered polymer was then washed with aceton and dried in a vacuum oven at a temperature of 50° C.

The specific operating conditions and the results obtained are recorded in Table II hereinabove.

EXAMPLE 16

Operating conditions similar to those of example 6 were used, however the methyl polyacrylate was replaced by a polymethacrylic acid having a molecular weight of $1.5 \times 10^6$, and the reaction was performed with monoethanolamine at a temperature of about 105° C.

The resulting modified polymer contained, by moles, 47% units A of the formula:

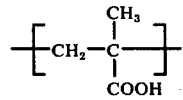

3% units B of the formula:

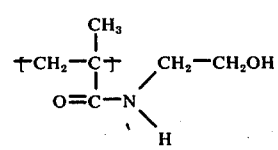

and 50% units B of the formula:

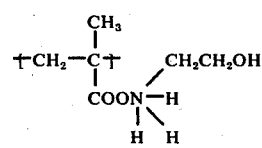

EXAMPLE 17

Operating conditions similar to those of example 1 were used, however the methyl polyacrylate was replaced by an ethyl polyacrylate having a molecular weight of $1.2 \times 10^6$ (test I) or by an ethyl polymethacrylate having a molecular weight of $0.8 \times 10^6$ (test II), the reaction being carried out at a temperature of 130° C in test I and 145° C in test II.

The modified polymer obtained in test I contained, by moles, 20% units A of the formula:

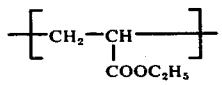

58% units B of the formula:

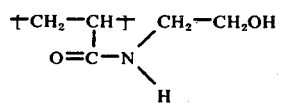

and 22% units C of the formula:

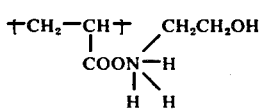

As to the modified polymer obtained in test II, it contained, by moles, 28% units A of the formula:

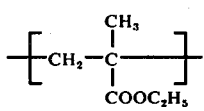

62% units B of the formula:

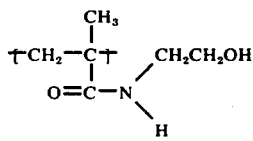

and 10% units of the formula:

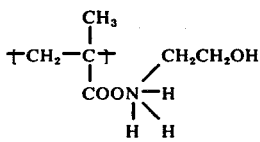

The hydrophilic modified acrylic polymers according to the invention may be advantageously used where it is endeavoured to improve the flow conditions of an aqueous liquid in a conduit. Indeed, adding a small amount of one of said modified polymers to an aqueous liquid flowing in a conduit results in considerably reducing the turbulence which is produced by the displacement of said liquid in said conduit. When performing flow tests in the presence and in the absence of the modified polymer, respectively, flow rates improved by about 15 to 20% where obtained, with a reduction of about 50 to 60% of the friction, when the flowing aqueous liquid contained 5 to 300 ppm of one of the modified polymers according to the invention.

What is claimed is:

1. Novel hydrodispersible or hydrosoluble modified acrylic polymer comprising expressed in molar percentages, $p$ % units A having the formula:

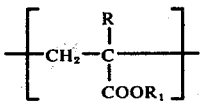

$q$ % units B having the formula:

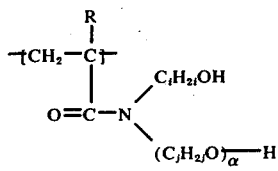

$r$ % units C having the formula:

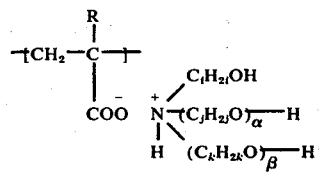

and $s$ % units D having the formula:

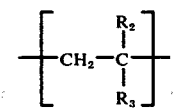

wherein each R stands for hydrogen, methyl or ethyl groups, and $R_1$ designates hydrogen or an alkyl group containing 1 to 4 carbon atoms, the symbols R and $R_1$ never representing at the same time an hydrogen atom or a methyl group, $i$, $j$ and $k$ designate integers comprised between 1 and 6, and $\alpha$ and $\beta$, which may be identical or different, are equal to 0 or 1, $R_2$ represents an hydrogen atom or a methyl group, $R_3$ designates a monovalent amido, amino, pyridyl or pyrrolidonyl group, and $p$, $I$, $r$ and $s$ represent integers which are so selected that $1 \leq p \leq 85$, $0 \leq q \leq 90$, $5 \leq r \leq 95$ and $0 \leq s \leq 30$, the sum $(p+q+r+s)$ being equal to 100.

2. Polymer according to claim 1, the molecular weight of which is comprised between $0.2 \times 10^6$ and $100 \times 10^6$.

3. Polymer according to claim 1, the molecular weight of which is between $0.4 \times 10^6$ and $50 \times 10^6$.

4. Polymer according to claim 3, the molecular weight of which is comprised between $1 \times 10^6$ and $20 \times 10^6$.

5. Polymer according to claim 1 wherein $s$ is 0.

6. Polymer according to claim 5, wherein the molar percentage proportions are such that $5 \leq p \leq 80$, $2 \leq q \leq 80$ and $7 \leq r \leq 80$.

7. Polymer according to claim 5, wherein the units A comprise at least one radical having the formula:

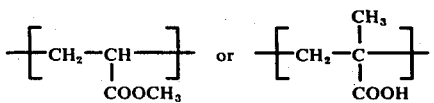

wherein the units B comprise at least one radical having the formula:

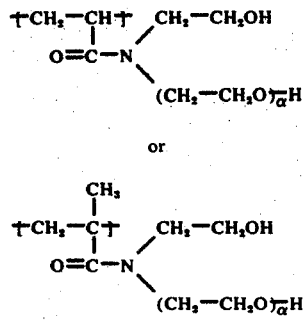

or and wherein the units C comprise at least one radical having the formula:

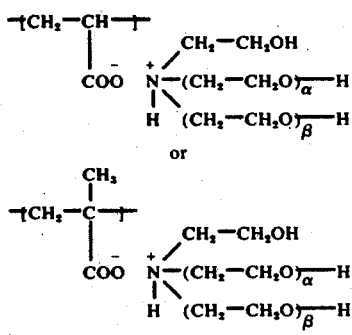

while $\alpha$ and $\beta$, which may be identical or different, are equal to 0 or 1.

8. A method of preparing hydrophilic modified acrylic polymers according to claim 1 comprising the steps of reacting between 50°–150° C an acrylic polymer which is derived from one or more monomers producing units A, with at least one alkanolamine having the formula:

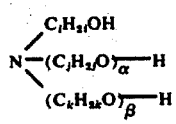

wherein $i, j, k$ represent numbers comprised between 1 and 6, and wherein $\alpha$ and $\beta$, which may be identical or different, are equal to 0 or 1, and then separating the thus obtained modified acrylic polymer from the reaction medium.

9. A method according to claim 8, wherein the amount of alkanolamine reacted with said acrylic polymer is so selected that the molar ratio of said amount of alkanolamine to the amount of polymer is comprised between 0.1 and 15.

10. A method according to claim 8, wherein the acrylic polymer to be modified is derived from at least one monomer selected from the group consisting of methacrylic and ethylacrylic acids, alkyl acrylates and ethylacrylates the alkyl radical of which contains 1 to 4 carbon atoms, and alkyl methacrylates the alkyl radical of which contains 2 to 4 carbon atoms.

11. A method according to claim 8, wherein said alkanolamine is selected from the group consisting of monoethanolamine, diethanolamine and triethanolamine.

12. A method according to claim 8 wherein the monomer producing units A is mixed with at least one monomer producing units D.

13. A method according to claim 8 wherein the amount of alkanolamine reacted with said acrylic polymer is so selected that the molar ratio of said amount of alkanolamine to the amount of polymer is between 0.3 and 5.

14. A method according to claim 8, wherein the reaction of alkanolamine with acrylic polymer is carried out in a solvent or diluent, and the acrylic polymer concentration in the solvent or diluent is between 1 and 60% by weight.

15. A method according to claim 14 wherein the reaction of alkanolamine with said acrylic polymer is performed at a temperature substantially equal to the boiling temperature of said solvent or diluent.

16. A process according to claim 14 wherein the solvent or diluent is a polar solvent or diluent.

17. A process according to claim 14 wherein the solvent or diluent is a non-polar solvent or diluent.

18. A process according to claim 16 wherein the polar solvent or diluent is water.

19. A method according to claim 18 wherein the acrylic polymer concentration in the water is between 3 and 40% by weight.

20. A method according to claim 17 wherein said non-polar solvent or diluent is an aliphatic, cycloaliphatic or aromatic hydrocarbon.

21. A method according to claim 20 wherein said non-polar solvent or diluent is xylene or toluene.

* * * * *